(12) United States Patent
Faaborg et al.

(10) Patent No.: US 9,171,434 B2
(45) Date of Patent: Oct. 27, 2015

(54) SELECTIVELY REDIRECTING NOTIFICATIONS TO A WEARABLE COMPUTING DEVICE

(71) Applicant: Google Inc., Mountain View, CA (US)

(72) Inventors: Alexander Faaborg, Mountain View, CA (US); Joshua Robin Kaplan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/320,137

(22) Filed: Jun. 30, 2014

(65) Prior Publication Data

US 2015/0262458 A1    Sep. 17, 2015

Related U.S. Application Data

(60) Provisional application No. 61/951,725, filed on Mar. 12, 2014.

(51) Int. Cl.
| | |
|---|---|
| *G04G 21/02* | (2010.01) |
| *G08B 5/22* | (2006.01) |
| *G08B 1/08* | (2006.01) |
| G08B 21/22 | (2006.01) |
| H04M 1/66 | (2006.01) |
| G04B 47/00 | (2006.01) |

(52) U.S. Cl.
CPC . *G08B 5/228* (2013.01); *G08B 1/08* (2013.01)

(58) Field of Classification Search
CPC ........ G08B 21/22; G04G 21/02; H04B 1/385; H04M 2250/12
See application file for complete search history.

(56) References Cited

U.S. PATENT DOCUMENTS

| | | | |
|---|---|---|---|
| 3,879,593 A * | 4/1975 | Larson | 200/512 |
| 5,477,129 A | 12/1995 | Myslinski | |
| 5,745,037 A * | 4/1998 | Guthrie et al. | 340/573.4 |
| 6,711,414 B1 | 3/2004 | Lightman et al. | |
| 7,088,234 B2 | 8/2006 | Naito et al. | |
| 8,541,745 B2 * | 9/2013 | Dickinson et al. | 250/340 |
| 8,854,925 B1 * | 10/2014 | Lee et al. | 368/10 |
| 8,856,948 B1 * | 10/2014 | Robison et al. | 726/26 |
| 2004/0133716 A1 | 7/2004 | Lee | |
| 2005/0184870 A1 | 8/2005 | Galperin et al. | |
| 2005/0272408 A1 | 12/2005 | Wilkes-Gibbs et al. | |
| 2006/0135218 A1 | 6/2006 | Son et al. | |

(Continued)

FOREIGN PATENT DOCUMENTS

| | | |
|---|---|---|
| EP | 1220459 A1 | 7/2002 |
| EP | 1615187 A1 | 1/2006 |
| WO | 2012172970 A1 | 12/2012 |

OTHER PUBLICATIONS

International Search Report and Written Opinion from International Application No. PCT/US2015/019636, dated Jun. 2, 2015, 12 pp.

*Primary Examiner* — Jack K Wang
(74) *Attorney, Agent, or Firm* — Shumaker & Sieffert, P.A.

(57) ABSTRACT

A first computing device can include at least one processor, and a notification redirection module operable by the at least one processor to receive sensor data from a second computing device, responsive to determining, based on the sensor data, that the second computing device is not being worn, output and for display, a notification, and responsive to determining, based on the sensor data, that the second computing device is being worn, send to the second computing device, an indication of the notification.

16 Claims, 5 Drawing Sheets

(56) References Cited

U.S. PATENT DOCUMENTS

| | | |
|---|---|---|
| 2007/0087790 A1 | 4/2007 | Worick et al. |
| 2008/0268780 A1 | 10/2008 | Werner et al. |
| 2010/0201533 A1 | 8/2010 | Kirby et al. |
| 2011/0080289 A1* | 4/2011 | Minton ............... 340/573.1 |
| 2012/0052922 A1 | 3/2012 | Li |
| 2012/0065909 A1 | 3/2012 | Patino et al. |
| 2012/0108215 A1 | 5/2012 | Kameli |
| 2012/0190305 A1 | 7/2012 | Wuidart |
| 2012/0194976 A1 | 8/2012 | Golko et al. |
| 2012/0306655 A1 | 12/2012 | Tan et al. |
| 2013/0076594 A1 | 3/2013 | Sirpal et al. |
| 2013/0127980 A1 | 5/2013 | Haddick et al. |
| 2013/0154358 A1 | 6/2013 | Kai |
| 2013/0214931 A1 | 8/2013 | Chia |
| 2013/0222236 A1* | 8/2013 | Gardenfors et al. .......... 345/156 |
| 2013/0225127 A1 | 8/2013 | Cavacuiti et al. |
| 2014/0045463 A1 | 2/2014 | Hsieh et al. |
| 2014/0172973 A1 | 6/2014 | Zadorozny et al. |
| 2014/0372097 A1* | 12/2014 | Karvonen et al. ................ 703/13 |
| 2015/0082406 A1* | 3/2015 | Park et al. .......................... 726/9 |
| 2015/0160622 A1* | 6/2015 | Kim et al. .............. G04G 21/02 |

* cited by examiner

SELECTIVELY REDIRECTING NOTIFICATIONS TO A WEARABLE COMPUTING DEVICE

This application claims the benefit of U.S. Provisional Application No. 61/951,725, filed Mar. 12, 2014, the entire content of which is hereby incorporated by reference.

BACKGROUND

Mobile computing devices allow a user to perform a variety of functions. For example, mobile computing devices may be capable of accessing the Internet, executing gaming applications, playing media, sending and receiving messages, as well as providing functionality of a traditional cellular telephone. In some examples, a user may wear such mobile computing devices (e.g., by attachment and/or coupling to the user's body and/or clothing). A host device may transmit, to the wearable device, at least an indication of a notification received so that the wearable computing device may output an alert based on the indication of the notification. However, in some instances, the user may not receive alerts output by the wearable computing device if the user removes the wearable computing device.

SUMMARY

In one example, the disclosure describes a method that includes receiving, by a first computing device, sensor data from a second computing device, responsive to determining, by the first computing device and based on the sensor data, that the second computing device is not being worn, outputting, by the first computing device and for display, a notification, and responsive to determining, by the first computing device and based on the sensor data, that the second computing device is being worn, sending, by the first computing device, to the second computing device, an indication of the notification.

In another example, the disclosure describes a method that includes responsive to determining, by a first computing device, that a clasp sensor of the first computing device is closed, enabling an accelerometer of the first computing device, and responsive to determining, by the first computing device and based on sensor data from the accelerometer, that the first computing device has not moved within a threshold period of time, transmitting, by the first computing device and to a second computing device, a command to cause the second computing device to stop redirecting notifications to the first computing device.

In an additional example, the disclosure describes first computing device comprising at least one processor, and a notification redirection module operable by the at least one processor to receive sensor data from a second computing device, responsive to determining, based on the sensor data, that the second computing device is not being worn, output and for display, a notification, and responsive to determining, based on the sensor data, that the second computing device is being worn, send to the second computing device, an indication of the notification.

In another example, the disclosure describes a first computing device comprising at least one processor and a notification redirection module operable by the at least one processor to responsive to determining that a clasp sensor of the first computing device is closed, enable an accelerometer of the first computing device, and responsive to determining that the first computing device has not moved within a threshold period of time based on sensor data from the accelerometer, transmit to a second computing device, a command to cause the second computing device to stop redirecting notifications to the first computing device.

The details of one or more examples are set forth in the accompanying drawings and the description below. Other features, objects, and advantages of the disclosure will be apparent from the description and drawings, and from the claims.

DETAILED DESCRIPTION

Figure 1:
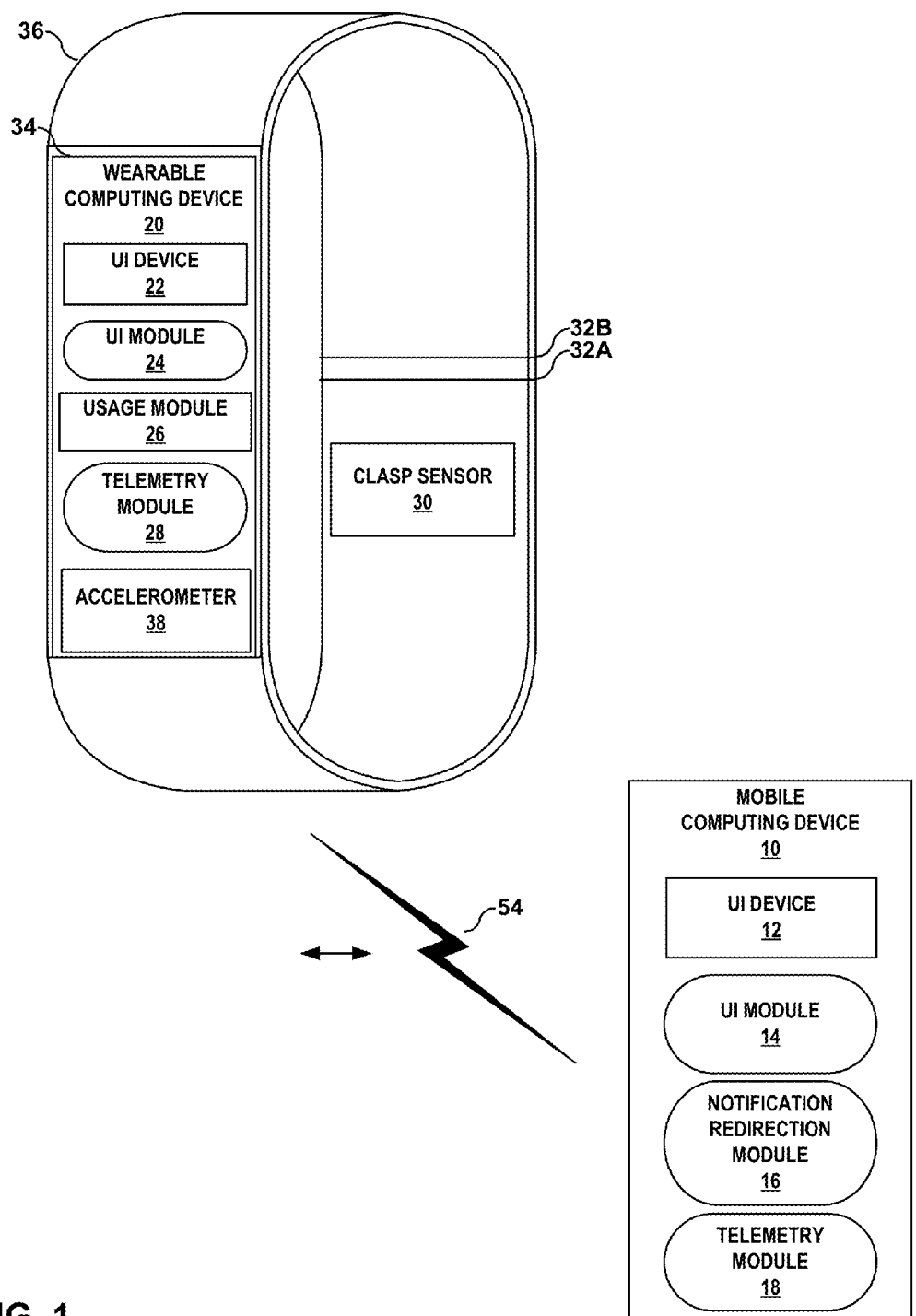
FIG. 1 is a conceptual block diagram illustrating an example system includes a mobile computing device and a wearable computing device in which the devices are operable to selectively transmit an indication of a notification based on whether the wearable computing device is being worn, in accordance with one or more techniques of the present disclosure.

Techniques according to the disclosure may enable a system, including a mobile computing device and a wearable computing device, to selectively redirect an indication of a notification between the mobile computing device and the wearable computing device based on whether the wearable computing device is being worn. For example, the wearable computing device may include one or more sensors, such as an accelerometer and a clasp sensor. Based on sensor data from at least one of a clasp sensor and an accelerometer of the wearable computing device, the mobile computing device may determine whether the mobile computing device is currently being worn and selectively redirect notifications from the mobile computing device to the wearable computing device.

In some implementations, if the mobile computing device determines that the wearable computing devices is currently being worn, the mobile computing device may automatically send an indication of a notification (such as recently-received notification data related to one or more services and/or applications) to the wearable computing device. In some implementations, if the mobile computing device determines that the wearable computing device is not currently being worn, the mobile computing device may proceed to output a notification. By determining whether to send an indication of received notification data to the wearable computing device based on whether the wearable computing device is being worn, techniques of this disclosure may reduce the amount of user interaction required to select whether the wearable computing device should receive notifications from the mobile computing device and may reduce the likelihood of missed notifications.

Throughout the disclosure, examples are described in which a computing device and/or a computing system may analyze information (e.g., sensor data, locations, speeds, physiological parameters, active application, etc.) associated with a computing device (e.g., a mobile computing device, a wearable computing device, etc.) only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, physiological parameters, active application, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information about the user is collected and used by the computing device.

FIG. 1 is a conceptual block diagram illustrating an example system includes a mobile computing device and a wearable computing device in which the devices are operable to selectively transmit an indication of a notification based on whether the wearable computing device is being worn, in accordance with one or more techniques of the present disclosure. In the example of FIG. 1, mobile computing device 10 includes at least one user interface (UI) device 12, a UI module 14, a notification redirection module 16, and a telemetry module 18. Other examples of mobile computing device 10 that implement techniques of this disclosure may include additional components not shown in FIG. 1. Examples of mobile computing device 10 may include, but are not limited to, portable devices such as mobile phones (including smart phones), laptop computers, desktop computers, tablet computers, smart television platforms, cameras, personal digital assistants (PDAs), etc.

In some examples, other types of devices may be operable to transmit an indication of a notification to wearable computing device 20. For instance, one or more servers, virtual devices (e.g., virtual machines), or cloud computing systems may transmit an indication of a notification to wearable computing device 20, either directly, or through mobile computing device 10. In the case that the notifications are sent by another type of device or system, such as a cloud computing system that includes one or more networked computing devices, through mobile computing device 10, mobile computing device 10 may receive and relay the notification to wearable computing device 20. As used herein, the term "notification" may refer to notification data received from an application or platform executing at the mobile computing device, the wearable computing device, and/or from a server as part of a notification service executing at a network (e.g., in a cloud) and may also refer to an alert output, by the mobile computing device or the wearable computing device, as an indication of the notification data (e.g., to indicate receipt of the notification data).

For the purposes of illustration only, wearable computing device 20 may include a wristband, armband, ankle band, etc. Wearable computing device 20 may also include other types of wearable computing devices other than those illustrated in FIG. 1, including any type of wearable computing device that supports receiving notifications. Accordingly, the illustrations of FIG. 1 should not be considered to limit the configuration of wearable computing device 20.

Wearable computing device 20 includes at least one user interface (UI) device 22, a UI module 24, usage module 26, telemetry module 28, clasp sensor 30, and accelerometer 38. In some examples, UI device 22 and other electronic components of wearable computing device 20 may be at least partially enclosed by a housing 34. Additionally, wearable computing device 20 can include band 36 or other member, such as a strap or frame, for physically securing wearable computing device 20 when being worn by a user. In the example of FIG. 1, band 36 is mechanically coupled to housing 34. In some examples, instead of band 36 and housing 34 being separate structures mechanically coupled to each other, band 36 and housing 34 may be a single, unitary structure. Other examples of wearable computing device 20 that implement techniques of this disclosure may include additional components not shown in FIG. 1.

Wearable computing device 20 can include at least one UI device 22. A user associated with wearable computing device 20 may interact with wearable computing device 20 by providing various user inputs into wearable computing device 20, e.g., using at least one UI device 22. In some examples, the at least one UI device 22 is configured to receive tactile, audio, or visual input. In addition to receiving input from a user, UI device 22 can be configured to output content such as a graphical user interface (GUI) for display, e.g., at a display device associated with wearable computing device 20. In some examples, UI device 22 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with wearable computing device 20. UI device 22 may be configured to disable a display of wearable computing device 20 responsive to determining that wearable computing device 20 is not being worn in some examples.

As shown in FIG. 1, wearable computing device 20 also can include UI module 24. UI module 24 can perform one or more functions to receive indications of input, such as user input, and send the indications of the input to other components associated with wearable computing device 20. For example, UI module 24 may receive an indication of a gesture performed by the user at UI device 22. UI module 24 may also receive information from components associated with wearable computing device 20, such as charging module 26. UI module 24 may cause other components associated with wearable computing device 20, such as UI device 22, to provide output based on the information. For instance, UI module 24 may receive information related to whether a user is currently wearing wearable computing device 20, e.g. whether sensor data from at least one of accelerometer 38 or clasp sensor 30 indicates that wearable computing device 20 is being worn.

UI module 24 may be implemented in various ways. For example, UI module 24 can be implemented as a downloadable or pre-installed application or "app." In another example, UI module 24 can be implemented as part of a hardware unit of wearable computing device 20. In another example, UI module 24 can be implemented as part of an operating system of wearable computing device 20.

As shown in the example of FIG. 1, the first portion of band 36 and second portion of band 36 mechanically connect using a clasp mechanism. Band 36 includes a first structure 32A and a second structure 32B, such as structures of a clasp, clip, snap, buckle or other mechanism operable to physically secure wearable computing device 20 when worn by a user. In the example shown in FIG. 1, band 36 includes a first structure 32A a and second portion of band 36 includes structure 32B Other examples of structures of a mechanism operable to physically secure wearable computing device 20 when worn by a user include a pin and a pin contact, a pressure sensor incorporated in one portion of the mechanism operable to physically secure wearable computing device 20, a proximity structure incorporated in one portion of the mechanism operable to physically secure wearable computing device 20, a magnetic reed switch incorporated in one portion of the mechanism operable to physically secure wearable computing device 20 and a magnetic in the complementary portion of the mechanism, etc.

In other examples, first structure 32A and second structure 32B may be structures embedded in or attached to band 36, but may not be part of a clasp, clip, snap, buckle or other mechanism operable to physically secure wearable computing device 36 when worn by the user. For example, first structure 32A and second structure 32B can include first and second portions of an electrical circuit within or attached to band 36.

Clasp sensor 30 is operable to detect whether the clasp is open or closed, attached or detached, connected or disconnected, etc. Clasp sensor 30 may be communicatively coupled with usage module 26 to provide an indication of whether wearable computing device 20 is secured to the user in some examples. While described as detecting whether a clasp is open or closed, clasp sensor 30 may detect whether any structures operable to physically secure wearable computing device 20 are open (e.g., uncoupled, not in physical contact, not forming a closed circuit, etc.) or closed (e.g., coupled, in physical contact, forming a closed circuit, etc.).

Wearable computing device 20 also includes usage module 26, which may comprise a notification redirection module in some examples. Usage module 26 may determine whether a user is wearing wearable computing device 20 based on the sensor data received from clasp sensor 30 and accelerometer 38. Indications that a user is wearing mobile computing device 20 may include data from clasp sensor 30, and/or movement data from accelerometer 38. In various examples, accelerometer 38 may comprise one or more of a solid-state gyroscope (e.g. a gyroscope capable of detecting orientation), accelerometer, a multi-axis MEMS (microelectronic mechanical sensor), and/or any other sensor capable of detecting movement of wearable computing device 20.

Usage module 26 may enable accelerometer 38 responsive to determining that clasp sensor 30 is closed. Additionally, responsive to determining that wearable computing device 20 has not moved within a threshold period of time and based on sensor data from accelerometer 38, telemetry module 28 of wearable computing device 20 may transmit a command to mobile computing device 10. The command may cause mobile computing device 10 to stop redirecting notifications to wearable computing device 20.

Usage module 26 may also determine whether wearable computing device 20 is being worn based on signals from additional sensors (not pictured) that may be part of wearable computing device 20. Such sensors may comprise one or more temperature sensors, blood pressure sensors, pulse sensors, and/or galvanic response sensors, and/or any other sensor type. In various examples the temperature sensor may detect the presence of a user based on a temperature change associated with the skin of a user being near or in contact with wearable computing device 20. Based on the temperature change caused by the presence of a user's skin, usage module 26 may determine that wearable computing device 20 is or is not being worn. More particularly, if a temperature measurement is outside the range of 36 degrees Celsius to 37 degrees Celsius, usage module 26 may determine that wearable computing device 20 is not being worn. Usage module 26 may also determine that wearable computing device 20 is or is not being worn based on a signal from the galvanometer that detects the conductance of a user's skin. More particularly, usage module 26 may detect that wearable computing device 20 is not being worn if a resistance measurement from the galvanometer is outside the range of 10 kiloohms to 10 megaohms, inclusive (corresponding to the typical resistance of human skin).

Wearable computing device 20 also includes telemetry module 28. In some examples, wearable computing device 20 can be configured to transmit data indicating whether wearable computing device 20 is being worn based on sensor data to mobile computing device 10 using telemetry module 28. Wearable computing device 20 may also receive an indication of a notification from mobile computing device 10 using telemetry module 28. The indication of the notification may comprise an indication of an image, text message, video, e-mail, or any other information related to a notification of mobile computing device 10. UI module 24 may output the indication of a notification for display.

In accordance with one or more aspects of this disclosure, mobile computing device 10 may be configured to receive sensor data from wearable computing device 20. Mobile computing device 10 may determine whether wearable computing device 20 is being worn based on the received sensor data. Responsive to determining, based on the sensor data, that wearable computing device 20 is not being worn, mobile computing device 10 may output a notification for display. Responsive to determining, based on the sensor data, that wearable computing device 20 is being worn, mobile computing device 10 may send an indication of the notification to wearable computing device 20.

Mobile computing device 10 may receive the sensor data from wearable computing device 20 via telemetry module 18. Mobile computing device 10 may receive messages and sensor data from telemetry module 28 via a wireless communication link 54. In some examples, wireless communication link 54 may comprise at least one of an IEEE 802.11x (so-called "WiFi"), Bluetooth, 3G or 4G wireless data connection.

Responsive to usage module 26 determining, and based on the sensor data, that wearable computing device 20 is currently being worn, notification redirection module 16 may redirect an indication of the notification to telemetry module 18 for transmission to wearable computing device 20. The indication of the notification may be the received notification data, a command to generate an alert based on the notification data, or any other information related to the notification. In various examples, the indication of the notification may comprise e-mail, a Multimedia Messaging Service (MMS) message, a video, an application notification, an image, a web page, or any other data of mobile computing device 10. In some examples, the indication of the notification may also comprise a text-based, and/or graphical indication of a notification, e.g. a notification that the user has a text message or an e-mail, etc.

Wearable computing device 20 may receive the indication of the notification via telemetry module 28. In some examples, wearable computing device 20 may output, for display at UI device 22, the indication of the notification.

Mobile computing device 10 and/or wearable computing device 20 may output, for display, an indication of whether wearable computing device 20 is currently being worn. In one example, wearable computing device 20 may output, for display, an indication at UI device 22 indicating whether wearable computing device 20 is not currently being worn based on sensor data. In examples where wearable computing device 20 is not currently being worn, the indication may further indicate that wearable computing device 20 is not configured to receive notifications from mobile computing device 10. In examples where sensor data of wearable computing device 20 indicates that wearable computing device 20 is not currently being worn, the indication may further indicate that wearable computing device 20 is not configured to receive an indication of a notification from mobile computing device 10.

Similarly, responsive to receiving a message indicating whether wearable computing device 20 is currently being worn, mobile computing device 10 may output and for display at UI device 12, an indication that wearable computing device 20 is currently being worn. As one example, responsive to receiving a message that wearable computing device 20 is currently being worn, UI module 14 may output a notification that indicates wearable computing device 20 is currently being worn. The message may further indicate that mobile computing device 10 is configured to transmit an indication of a notification to wearable computing device 20 while wearable computing device 20 is currently being worn.

In some other examples, mobile computing device 10 may be communicatively coupled with more than one wearable computing device, e.g., similar to wearable computing device 20. Each wearable computing device may be configured to receive an indication of a notification from mobile computing device 10 via a wireless communication link, such as wireless communication link 54. Each of the wearable computing devices may be configured to send a message indicating whether the wearable computing devices are currently being worn, as described above with respect to wearable computing device 20.

Each message indicating whether wearable computing device 20 is being worn may include an identifier that identifies each of the wearable computing devices to mobile computing device 10. Based on the identifiers included in the message, mobile computing device 10 may determine which of the wearable computing devices are currently being worn, and should not receive an indication of a notification from mobile computing device 10, and which of the wearable computing devices should receive an indication of a notification from mobile computing device 10.

Figure 2:
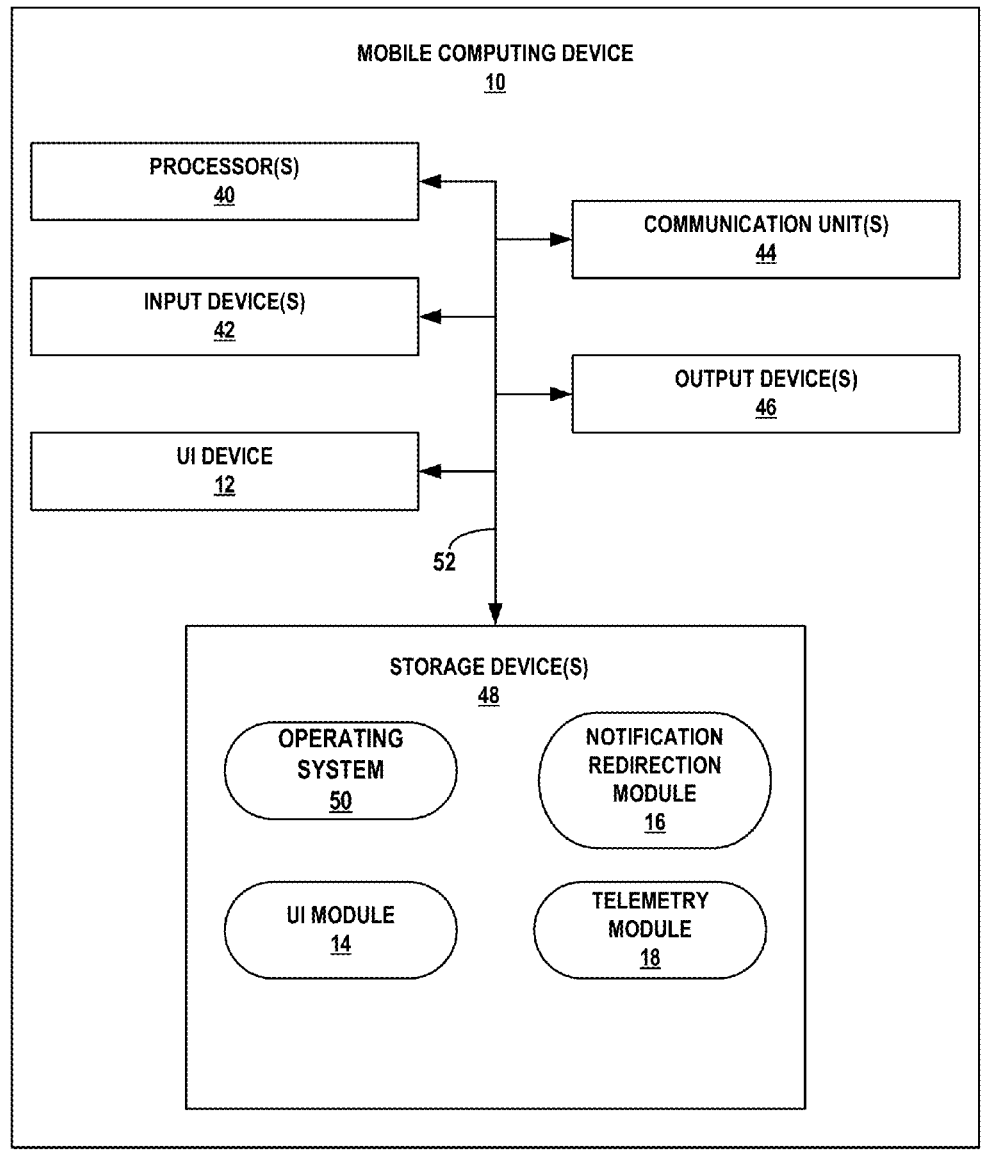
FIG. 2 is a block diagram illustrating further details of one example of a mobile computing device, in accordance with one or more techniques of the present disclosure.

FIG. 2 is a block diagram illustrating further details of one example of a mobile computing device 10 as shown in FIG. 1, in accordance with one or more techniques of the present disclosure. FIG. 2 illustrates only one particular example of mobile computing device 10 as shown in FIG. 1, and many other examples of mobile computing device 10 may be used in other instances.

As shown in the example of FIG. 2, mobile computing device 10 includes one or more processors 40, one or more input devices 42, one or more communication units 44, one or more output devices 46, one or more storage devices 48, and user interface (UI) device 12. In the example of FIG. 2, mobile computing device 10 further includes UI module 14, notification redirection module 16, telemetry module 18, and operating system 50, which are executable by one or more processors 40. Each of components 12, 40, 42, 44, 46, and 48 are coupled (physically, communicatively, and/or operatively) using communication channels 52 for inter-component communications. In some examples, communication channels 52 may include a system bus, a network connection, an inter-process communication data structure, or any other method for communicating data. UI module 14, telemetry module 18, and operating system 50, may also communicate information with one another, as well as with other components in mobile computing device 10.

One or more processors 40, in one example, are configured to implement functionality and/or process instructions for execution within mobile computing device 10. For example, processors 40 may be capable of processing instructions stored by one or more storage devices 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within mobile computing device 10 during operation. Storage devices 48, in some examples, include a computer-readable storage medium or computer-readable storage device. In some examples, storage devices 48 include a temporary memory, meaning that a primary purpose of storage device 48 is not long-term storage. Storage devices 48, in some examples, include a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in some examples, are used by software or applications running on mobile computing device 10 (e.g., mobile computing device access mode module 16) to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 10, in some examples, also includes one or more communication units 44. Mobile computing device 10, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, 4G, WiGig, and WiFi radios computing devices as well as Universal Serial Bus (USB). In some examples, mobile computing device 10 utilizes communication unit 44 to wirelessly communicate with an external device such as wearable computing device 20. Communication unit 44 may be controlled by telemetry module 18.

Mobile computing device 10, in one example, also includes one or more input devices 42. Input device 42, in some examples, is configured to receive input from a user through tactile, audio, or video sources. Examples of input device 42 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 46 may also be included in mobile computing device 10. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), organic light emitting diode (OLED), or any other type of device that can generate intelligible output to a user. In some examples, UI device 12 may include functionality of one or more of input devices 42 and/or output devices 46.

Mobile computing device 10 also can include UI device 12. In some examples, UI device 12 is configured to receive tactile, audio, or visual input. In addition to receiving input from a user, UI device 12 can be configured to output content such as a GUI for display at a display device, such as a presence-sensitive display. In some examples, UI device 12 can include a presence-sensitive display that displays a GUI and receives input from a user using capacitive, inductive, and/or optical detection at or near the presence sensitive display. In some examples, UI device 12 is both one of input devices 44 and one of output devices 46.

In some examples, UI device 12 of mobile computing device 10 may include functionality of input devices 42 and/or output devices 46. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 46.

Mobile computing device 10 may include operating system 50. Operating system 50, in some examples, controls the operation of components of mobile computing device 10. For example, operating system 50, in one example, facilitates the communication of UI module 14, and notification redirection module 16 with processors 40, communication units 44, storage devices 48, input devices 42, and output devices 46. UI module 14, telemetry module, and notification redirection module 16 can each include program instructions and/or data that are executable by mobile computing device 10 (e.g., by one or more processors 40). As one example, UI module 14 can include instructions that cause mobile computing device 10 to perform one or more of the operations and actions described in the present disclosure.

In some examples, notification redirection module 16 may be operable to transmit messages with a mobile computing device, e.g., via a direct communication protocol between mobile computing device 10 and wearable computing device 20, such as via a Bluetooth, 3G, 4G, or WiFi wireless network connection, e.g. communication link 54. For example, when mobile computing device 10 is able to establish a direct wireless communication connection with wearable computing device 20.

Mobile computing device 10 may also include notification redirection module 16. Notification redirection module 16 may be configured to redirect notifications from mobile computing device to wearable computing device 20 based on whether notification redirection module 16 determines that wearable computing device 20 is currently being worn. Notification redirection module 16 may determine that wearable computing device 20 is being worn based on messages received from wearable computing device 20 via telemetry module 18. Wearable computing device 20 may transmit sensor data to mobile computing device 10 that indicates whether wearable computing device 20 is currently being worn, e.g. sensor data generated by clasp sensor 30 and/or accelerometer 38.

Notification redirection module 16 may receive sensor data via telemetry module 18 indicating whether wearable computing device 20 is being worn. Notification redirection module 16 may determine that wearable computing device 20 is being worn based on whether the sensor data (e.g., data from at least one of accelerometer 38 or clasp sensor 30) indicates that wearable computing devices has moved within a threshold amount of time.

Usage module 26 of wearable computing device 20 may receive sensor data from clasp sensor 30 and accelerometer 38 periodically, e.g., via an interrupt, or by polling clasp sensor 30 and/or accelerometer 38. Telemetry module 28 may transmit the sensor data to mobile computing device 10. A user, operating system, software application, etc. may configure a threshold period of time that passes without receiving an indication of movement from clasp sensor 30 or accelerometer 38 before usage module 26 determines that wearable computing device 20 is not currently being worn. If sensor data indicates that wearable computing device 20 has moved within the threshold period of time, usage module 26 may generate a message, which may include the sensor data. Telemetry module 28 of wearable computing device 20 sends the message to telemetry module 18 of mobile computing device 10. Responsive to receiving the message, notification redirection module 16 configures or may signal mobile computing device to 10 transmit an indication of notifications generated by mobile computing device 10 to wearable computing device 20.

If notification redirection module 16 determines, based on the sensor data received from wearable computing device 20, that wearable computing device 20 is being worn, notification redirection module 16 configures UI module 14 to output notifications at UI device 12, and does not generate any indications of notifications to be sent to wearable computing device 20.

In some examples, responsive to determining that wearable computing device 20 is not being worn, notification redirection module 16 of wearable computing device 20 may output, for transmission, a command that causes wearable computing device 20 to transition from operating in a full access mode to operating in a reduced access mode. Telemetry module 18 may transmit the command to telemetry module 28 of wearable computing device 20, which receives the command.

As an example, if wearable computing device 20 is being worn, wearable computing device 20 typically operates in a "full access" mode, in which all functionality of wearable computing device 20 is accessible to a user of wearable computing device 20. However, notification redirection module 16 may later determine that wearable computing device 20 is no longer being worn, e.g., based on sensor data received from wearable computing device 20. Responsive to determining that wearable computing device 20 is not being worn, mobile computing device 10 may transmit a command that causes wearable computing device 10 to transition from operating in the full access mode to operating in a reduced access mode, in which less functionality is available of wearable computing device 20 relative to the full access mode. When operating in a reduced access mode, wearable computing device 20 may be inaccessible to unauthorized users via a lock mechanism, may disable visual and/or audio output, may not display any previously received notifications, and/or may be configured to transmit the location of wearable computing device 20 to the user of mobile computing device 10 if wearable computing device 20 is lost, as some examples.

As described above, sensor data may include data received from clasp sensor 36 and/or data received from accelerometer 38. Wearable computing device 20 may determine based on the sensor data that data received from clasp sensor 30 and/or accelerometer 38 indicates that the clasp of wearable computing device 20 is in a locked state. As described above, the clasp may be in a locked state if the clasp is closed, and may be in an unlocked state when the clasp is open. Clasp sensor 30 may detect that any structures (e.g., structures 32A and 32B) operable to physically secure wearable computing device 20 are open (e.g., uncoupled, not in physical contact, not forming a closed circuit, etc.) or closed (e.g., coupled, in physical contact, forming a closed circuit, etc.).

Responsive to determine that the data received from accelerometer 38 indicates that wearable computing device 20 is in a locked state, wearable computing device 20 may further determine that data from accelerometer 38 indicates that wearable computing device 20 has not moved within a threshold amount of time. For example, usage module 26 may determine that wearable computing device 20 has not moved within a threshold amount of time based on whether wearable computing device 20 detects any sensor data that indicates wearable computing device 20 has moved within the threshold amount of time.

In some additional examples, responsive to determining that the sensor data from accelerometer 38 indicates that wearable computing device 20 has not moved within a threshold amount of time, mobile computing device 10 may determine that wearable computing device 10 is not being worn. Additionally, responsive to mobile computing device 10 determining that the data received from accelerometer 38 indicates that the wearable computing device 20 has moved within a threshold amount of time, mobile computing device 10 may determine that wearable computing device 10 is being worn.

A user or application may set the threshold amount of time may in some examples. For instance, the threshold period of time may comprise 5 seconds, 30 seconds, 1 minute, 10 minutes, another user-configurable duration, etc. In other examples, the threshold amount of time may be set based on observable user behavior. For instance, a user may indicate that the threshold period of time is too low or too high via an application, and the application may adjust the threshold time within which to determine whether wearable computing device 20 is being worn.

In various examples, usage module 26 may be configured to determine that wearable computing device is being worn or not worn responsive to detecting movements that indicate wearable computing device 20 moved a threshold amount within a threshold amount of time of a current time. For instance, accelerometer 38 may detect a movement within threshold amount (e.g., exceeding a minimum movement magnitude value). Responsive to detecting the movement within the threshold amount, usage module 26 may determine that wearable computing device 20 is being worn. By detecting movement data within a threshold amount, and generating sensor data that wearable computing device 20 is being worn responsive to detecting that indication, usage module 26 may be configured to ignore small vibrations or other barely perceptible movements that a user did not make. For example, usage module 26 may ignore movements due to environmental factors.

In other examples, notification redirection module 16 may be configured to determine that wearable computing device 20 is not being worn based on sensor data received from accelerometer 38. More particularly, usage module 26 may be configured to determine that wearable computing device 20 is not being worn responsive to usage module 26 determining that the sensor data from accelerometer 38 indicates that wearable computing device 20 has moved a threshold amount within a threshold amount of time of a current time.

The criteria used to detect that wearable computing device 20 has moved may also include detecting a minimum number of movements within the threshold amount, and responsive to detecting the minimum number of movements, generating an indication that wearable computing device 20 is being worn. Determining that wearable computing device 20 has moved responsive to notification redirection module 16 detecting a minimum number of movements may avoid falsely indicating that wearable computing device 20 has moved due to a few isolated movements. By requiring movements to be within a threshold amount, notification redirection module 16 may reduce the likelihood of "false positives," i.e. determining that wearable computing device 20 is not in a locked state when detected movements have small magnitudes or are infrequent.

The threshold amount of movements that notification redirection module 16 detects may be configurable by a user, application, etc. In one example, a user may input various parameters, such as height, weight, etc., to determine the threshold. In another example, a user of wearable computing device 20 may execute an application that determines allows a user to select from a number of preset threshold movement amounts (e.g., low, medium, or high threshold movement amounts).

Mobile computing device 10 can include additional components that, for clarity, are not shown in FIG. 2. Similarly, the components of mobile computing device 10 shown in FIG. 2 may not be necessary in every example of mobile computing device 10.

Figure 3:
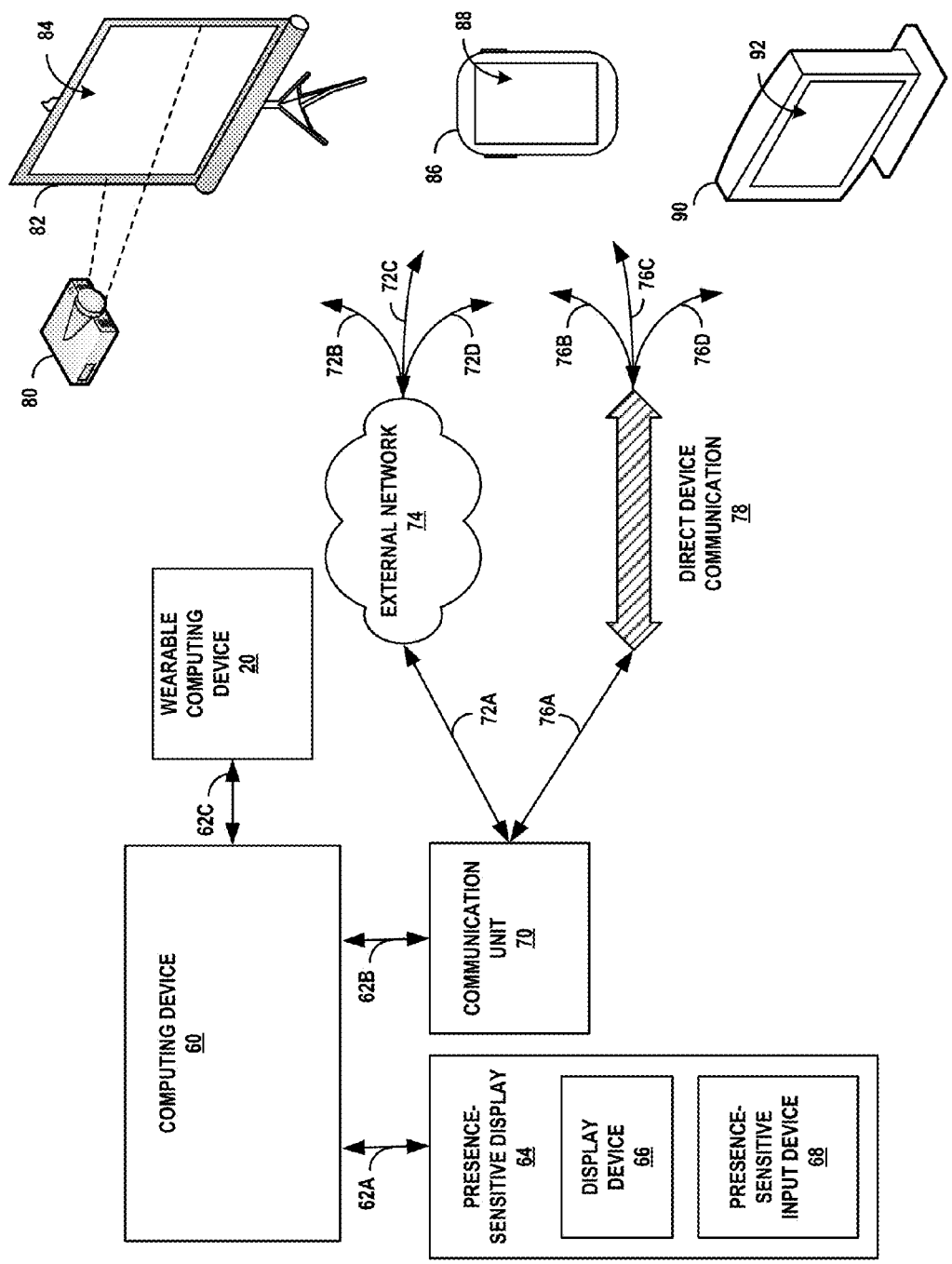
FIG. 3 is a conceptual block diagram illustrating an example mobile computing device that outputs graphical content for display at a remote device and selectively outputs an indication of a notification to a wearable computing device based on whether the wearable computing device is being worn, in accordance with one or more techniques of the present disclosure.

FIG. 3 is a conceptual block diagram illustrating an example mobile computing device that outputs graphical content for display at a remote device and selectively outputs an indication of a notification to a wearable computing device based on whether the wearable computing device is being worn, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a mobile computing device 10, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by mobile computing device 10 in FIGS. 1 and 2, a computing device may refer to a portable or mobile device such as mobile phones (including smart phones), laptop computers, wearable computing devices such as smart watches or smart glasses, etc. In some examples, a computing device may be a desktop computer, tablet computer, smart television platform, camera, personal digital assistant (PDA), server, mainframe, etc.

Presence-sensitive display 64 may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 22 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64, which is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a display device, such as a presence-sensitive display, that is included in and/or operatively coupled to the respective remote device.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at a display of one or more the remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with one or more aspects of the disclosure, computing device 60 can be configured to receive sensor data. In some examples, the sensor data may be from at least one of clasp sensor 30 of wearable computing device 20, and accelerometer 38 of wearable computing device 20. Responsive to determining by computing device 60 and based on the sensor data, that wearable computing device 20 is not being worn, computing device 60 may output and for display, e.g., at one or more of presence-sensitive display 64, projector 80, mobile device 86, and remote display 90, a notification using communication unit 70. Responsive to determining, by computing device 60 and based on the sensor data, that wearable computing device 20 is being worn, computing device 60 may send, to wearable computing device 20, an indication of the notification using communication unit 70.

Figure 4:
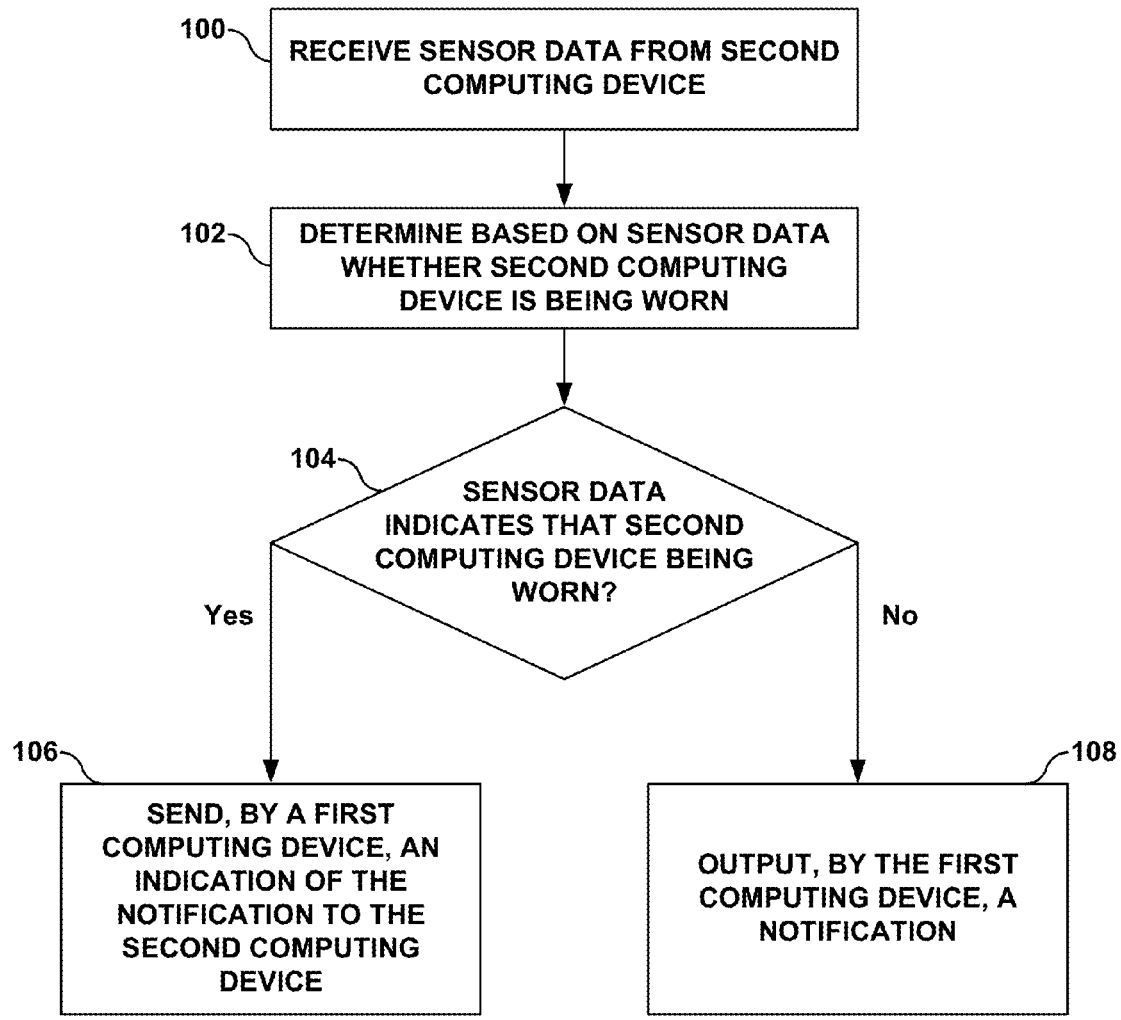
FIG. 4 is a flow diagram illustrating example operations for selectively outputting notifications at a wearable computing device based at least in part on whether the wearable computing device is being worn, in accordance with one or more techniques of the present disclosure.

FIG. 4 is a flow diagram illustrating example operations for selectively outputting notifications at a wearable computing device based at least in part on whether the wearable computing device is being worn, in accordance with one or more techniques of the present disclosure. The operations shown in FIG. 4 may be performed by one or more processors of a computing device, such as wearable computing device 20 and/or mobile computing device 10 illustrated in FIG. 1 and FIG. 2. For purposes of illustration, the operations of FIG. 4 are described below within the context of wearable computing device 20 of FIG. 1 and FIG. 2. However, computing devices having configurations different than that of mobile computing device 10 and wearable computing device 20 may perform the operations of FIG. 4.

The techniques of FIG. 4 include receiving, by mobile computing device 10, a sensor data from wearable computing device 20 (100). In some examples, the sensor data includes data received from at least one of clasp sensor 30 of wearable computing device 20 and data received from accelerometer 38 of wearable computing device 20. Notification usage module 26 of wearable computing device 20 may interpret the sensor data received from clasp sensor 30 and/or accelerometer 38.

Notification redirection module 16 of mobile computing device 10 may determine, based on the sensor data, whether wearable computing device 20 is being worn (102). Responsive to notification redirection module 26 determining, and based on the sensor data, that wearable computing device 20 is being worn ("Yes" branch of decision block 104), telemetry module 18 of mobile computing device 10 may send, to telemetry module 28, an indication of the notification via communication link 54 (106). Responsive to notification redirection module 16 determining that wearable computing device 20 indicates that wearable computing device 20 is not currently being worn and based on the sensor data ("No" branch of decision block 104), UI device 22 may output, and for display, a notification (108).

Figure 5:
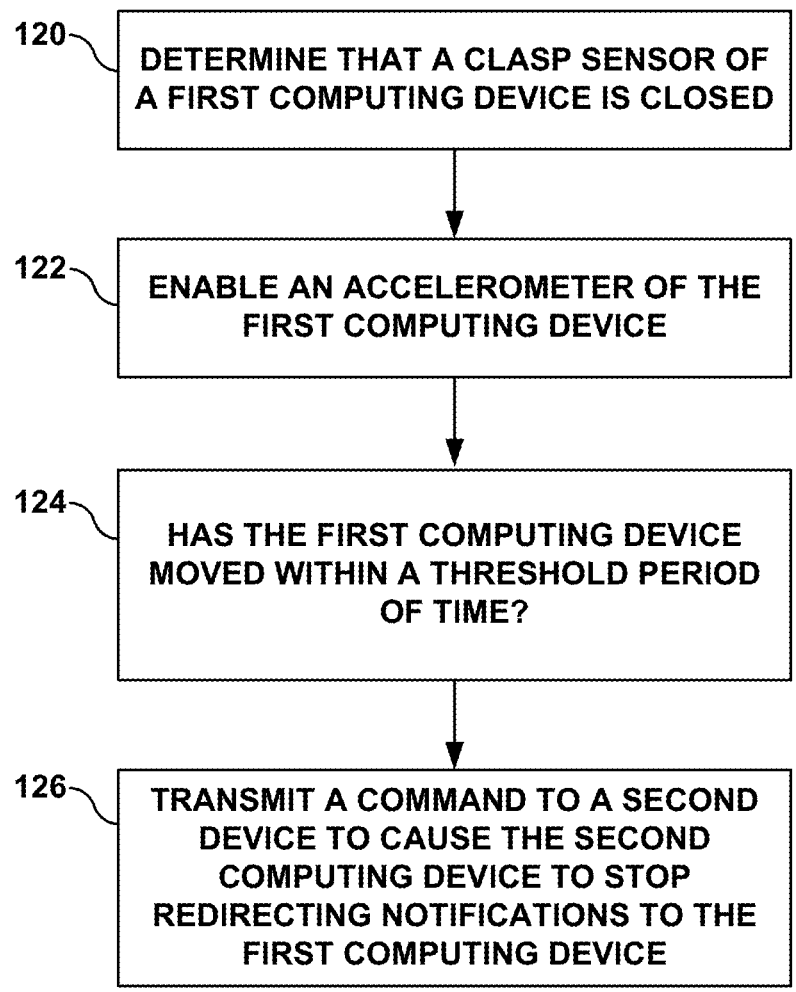
FIG. 5 is a flow diagram illustrating example operations for selectively outputting notifications at a wearable computing device based at least in part on whether the wearable computing device is being worn, in accordance with one or more techniques of the present disclosure.

FIG. 5 is a flow diagram illustrating example operations for selectively outputting notifications at a wearable computing device based at least in part on whether the wearable computing device is being worn, in accordance with one or more techniques of the present disclosure. The operations shown in FIG. 5 may be performed by one or more processors of a computing device, such as wearable computing device 20 and/or mobile computing device 10 illustrated in FIG. 1 and FIG. 2. For purposes of illustration, the operations of FIG. 5 are described below within the context of wearable computing device 20 of FIG. 1 and FIG. 2. However, computing devices having configurations different than that of mobile computing device 10 and wearable computing device 20 may perform the operations of FIG. 4.

The techniques of FIG. 5 include determining, by usage module 26 of wearable computing device 20, that clasp sensor 30 of wearable computing device 20 is closed (120). Responsive to usage module 26 determining that clasp sensor 30 is closed, wearable usage module 26 of computing device 20 may be configured to enable accelerometer 38 of wearable computing device 20 (122). Usage module 26 of wearable computing device 20 also determines whether wearable computing device 20 has not moved within a threshold period of time based on sensor data from accelerometer 38 (124). Responsive to determining, that wearable computing device 20 has not moved within a threshold period of time, telemetry module 28 of wearable computing device 20 may transmit to mobile computing device 10 a command to cause mobile computing device 10 to stop redirecting notifications to wearable computing device 20 (126).

In one example, determining that that wearable computing device 20 has not moved within a threshold period of time may be based on the sensor data from accelerometer 38 and a resistance measurement from a galvanic response sensor of wearable computing device 20. The resistance measurement may indicate that wearable computing device 20 is not being worn if the resistance measurement is outside a range of 10 kiloohms to 10 megaohms, inclusive. In another example, determining that wearable computing device 20 has not moved within the threshold period of time may be based on sensor data from accelerometer 38 and a temperature measurement from a temperature sensor of wearable computing device 20. The temperature measurement may indicate that wearable computing device 20 is not being worn if the temperature measurement is outside a range of 36 degrees Celsius to 37 degrees Celsius, inclusive.

In another example, responsive to wearable computing device 20 determining and based on the sensor data from accelerometer 38, that mobile computing device 10 has not moved within a threshold period of time, wearable computing device 20 may disable a display of wearable computing device 20, such as a display of UI device 22.

Example 1

A method comprising: receiving, by a first computing device, sensor data from a second computing device, responsive to determining, by the first computing device and based on the sensor data, that the second computing device is not being worn, outputting, by the first computing device and for display, a notification, and responsive to determining, by the first computing device and based on the sensor data, that the second computing device is being worn, sending, by the first computing device, to the second computing device, an indication of the notification.

Example 2

The method of example 1, wherein the sensor data includes data received from at least one of a clasp sensor of the second computing device and an accelerometer of the second computing device.

Example 3

The method of any combination of examples 1-2, wherein determining, by the first computing device and based on the sensor data, that the second computing device is not being worn is based on at least one of the sensor data indicating that the clasp of the second computing device is in an open state and the sensor data indicating that the second computing device has not moved within a threshold amount of time.

Example 4

The method of any combination of examples 1-3, wherein determining, by the first computing device and based on the sensor data, that the second computing device is being worn is based on at least one of the sensor data indicating that the clasp of the second computing device is in a closed state and the sensor data indicating that the second computing device has moved within a threshold amount of time.

Example 5

The method of any combination of examples 1-4, further comprising: responsive to determining, by the first computing device, that the second computing device is being worn, outputting, by the first computing device and for display, a notification that indicates the second computing device is being worn.

Example 6

The method of any combination of examples 1-5, further comprising: responsive to determining that the second computing device is not being worn, outputting, by the first computing device, for transmission to the second computing device, a command to cause the second computing device to transition from operating in a full access mode to operating in a reduced access mode.

Example 7

A method comprising: responsive to determining, by a first computing device, that a clasp sensor of the first computing device is closed, enabling an accelerometer of the first computing device, and responsive to determining, by the first computing device and based on sensor data from the accelerometer, that the first computing device has not moved within a threshold period of time, transmitting, by the first computing device and to a second computing device, a command to cause the second computing device to stop redirecting notifications to the first computing device.

Example 8

The method of example 7, wherein determining that the first computing device has not moved within the threshold period of time is based on the sensor data from the accelerometer and a resistance measurement from a galvanic response sensor of the first computing device, and the resistance measurement indicates that the first computing device is not being worn if the resistance measurement is outside a range of 10 kiloohms to 10 megaohms, inclusive.

Example 9

The method of any of examples 7-8, wherein determining that the first computing device has not moved within the threshold period of time is based on the sensor data from the accelerometer and a temperature measurement from a temperature sensor of the first computing device, and the temperature measurement indicates that the first computing device is not being worn if the temperature measurement is outside a range of 36 degrees Celsius to 37 degrees Celsius inclusive.

Example 10

The method of any of examples 7-9, further comprising: responsive to determining, by the first computing device and based on the sensor data from the accelerometer, that the first computing device has not moved within a threshold period of time, disabling, by the first computing device a display of the first computing device.

Example 11

A first computing device comprising: at least one processor, and a notification redirection module operable by the at least one processor to: receive sensor data from a second computing device, responsive to determining, based on the sensor data, that the second computing device is not being worn, output and for display, a notification, and responsive to determining, based on the sensor data, that the second computing device is being worn, send to the second computing device, an indication of the notification.

Example 12

The first computing device of example 11, wherein the sensor data includes data received from at least one of a clasp sensor of the second computing device and an accelerometer of the second computing device.

Example 13

The first computing device of example 12, wherein the notification redirection module is operable by the at least one processor to determine, based on the sensor data, that the second computing device is not being worn is based on at least one of the sensor data indicating that the clasp of the second computing device is in an open state and the sensor data indicating that the second computing device has not moved within a threshold amount of time.

Example 14

The first computing device of any of examples 11-13, wherein the notification redirection module is operable by the at least one processor to determine, based on the sensor data, that the second computing device is being worn is based on at least one of the sensor data indicating that the clasp of the second computing device is in a closed state and the sensor data indicating that the second computing device has moved within a threshold amount of time.

Example 15

The first computing device of any of examples 11-14, wherein the notification module is further operable to, responsive to determining that the second computing device is being worn, output, for display, a notification that indicates that the second computing device is being worn.

Example 16

The first computing device of any of examples 11-15, wherein the notification module is further operable to, responsive to determining that the second computing device is not being worn, output, for transmission to the second computing device, a command to cause the second computing device to transition from operating in a full access mode to operating in a reduced access mode.

Example 17

A first computing device comprising: at least one processor, and a notification redirection module operable by the at least one processor to: responsive to determining that a clasp sensor of the first computing device is closed, enable an accelerometer of the first computing device, and responsive to determining that the first computing device has not moved within a threshold period of time based on sensor data from the accelerometer, transmit to a second computing device, a command to cause the second computing device to stop redirecting notifications to the first computing device.

Example 18

The first computing device of example 17, wherein: the notification redirection module is operable to determine that the first computing device has not moved within the threshold period of time based on the sensor data from the accelerometer and a resistance measurement from a galvanic response sensor of the first computing device, and the resistance measurement indicates that the first computing device is not being worn if the resistance measurement is outside a range of 10 kiloohms to 10 megaohms, inclusive.

Example 19

The first computing device of any of examples 17-18, wherein: the notification redirection module is operable to determine that the first computing device has not moved within the threshold period of time based on the sensor data from the accelerometer and a temperature measurement from a temperature sensor of the first computing device, and the temperature measurement indicates that the first computing device is not being worn if the temperature measurement is outside a range of 36 degrees Celsius to 37 degrees Celsius inclusive.

Example 20

The first computing device of any of examples 17-19, wherein the notification module is further operable to: responsive to determining that the first computing device has not moved within a threshold period of time based on the sensor data from the accelerometer, disable a display of the first computing device.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    receiving, by a first computing device, sensor data from a second computing device, wherein the sensor data indicates movement of the second computing device;
    responsive to determining, by the first computing device and based on the sensor data, that the second computing device is not being worn:
        outputting, by the first computing device and for display, a notification; and
        outputting, by the first computing device, for transmission to the second computing device, a command to cause the second computing device to transition from operating in a full access mode to operating in a reduced access mode, wherein at least a portion of functionality of the second computing device is inaccessible via a lock mechanism while the second computing device is operating in the reduced access mode; and
    responsive to determining, by the first computing device and based on the sensor data, that the second computing device is being worn, sending, by the first computing device, to the second computing device, an indication of the notification.

2. The method of claim 1, wherein the sensor data includes data received from at least one of a clasp sensor of the second computing device and an accelerometer of the second computing device.

3. The method of claim 2, wherein determining, by the first computing device and based on the sensor data, that the second computing device is not being worn is based on at least one of the sensor data indicating that the clasp of the second computing device is in an open state and the sensor data indicating that the second computing device has not moved within a threshold amount of time.

4. The method of claim 2, wherein determining, by the first computing device and based on the sensor data, that the second computing device is being worn is based on at least one of the sensor data indicating that the clasp of the second computing device is in a closed state and the sensor data indicating that the second computing device has moved within a threshold amount of time.

5. The method of claim 1, further comprising:
    responsive to determining, by the first computing device, that the second computing device is being worn, outputting, by the first computing device and for display, a notification that indicates the second computing device is being worn.

6. A method comprising:
    responsive to determining, by a first computing device, that a clasp sensor of the first computing device is closed, enabling an accelerometer of the first computing device; and
    responsive to determining, by the first computing device and based on sensor data from the accelerometer, that the first computing device has not moved within a threshold period of time:
        transmitting, by the first computing device and to a second computing device, a command to cause the second computing device to stop redirecting notifications to the first computing device; and
        disabling, by the first computing device, a display of the first computing device.

7. The method of claim 6, wherein:
    determining that the first computing device has not moved within the threshold period of time is based on the sensor data from the accelerometer and a resistance measurement from a galvanic response sensor of the first computing device, and
    the resistance measurement indicates that the first computing device is not being worn if the resistance measurement is outside a range of 10 kiloohms to 10 megaohms, inclusive.

8. The method of claim 6, wherein:
    determining that the first computing device has not moved within the threshold period of time is based on the sensor data from the accelerometer and a temperature measurement from a temperature sensor of the first computing device, and
    the temperature measurement indicates that the first computing device is not being worn if the temperature measurement is outside a range of 36 degrees Celsius to 37 degrees Celsius inclusive.

9. A first computing device comprising:
    at least one processor; and
    a notification redirection module operable by the at least one processor to:
        receive sensor data from a second computing device, wherein the sensor data indicates movement of the second computing device;

responsive to determining, based on the sensor data, that the second computing device is not being worn:
   output and for display, a notification; and
   output, for transmission to the second computing device, a command to cause the second computing device to transition from operating in a full access mode to operating in a reduced access mode, wherein at least a portion of functionality of the second computing device is inaccessible via a lock mechanism while the second computing device is operating in the reduced access mode; and responsive to determining, based on the sensor data, that the second computing device is being worn, send to the second computing device, an indication of the notification.

10. The first computing device of claim 9, wherein the sensor data includes data received from at least one of a clasp sensor of the second computing device and an accelerometer of the second computing device.

11. The first computing device of claim 10, wherein the notification redirection module is operable by the at least one processor to determine, based on the sensor data, that the second computing device is not being worn is based on at least one of the sensor data indicating that the clasp of the second computing device is in an open state and the sensor data indicating that the second computing device has not moved within a threshold amount of time.

12. The first computing device of claim 10, wherein the notification redirection module is operable by the at least one processor to determine, based on the sensor data, that the second computing device is being worn is based on at least one of the sensor data indicating that the clasp of the second computing device is in a closed state and the sensor data indicating that the second computing device has moved within a threshold amount of time.

13. The first computing device of claim 9, wherein the notification redirection module is further operable to, responsive to determining that the second computing device is being worn, output, for display, a notification that indicates that the second computing device is being worn.

14. A first computing device comprising:
at least one processor;
a clasp sensor;
an accelerometer; and
a notification redirection module operable by the at least one processor to:
   responsive to determining that a clasp sensor of the first computing device is closed, enable an accelerometer of the first computing device; and
   responsive to determining that the first computing device has not moved within a threshold period of time based on sensor data from the accelerometer:
      transmit to a second computing device, a command to cause the second computing device to stop redirecting notifications to the first computing device; and
      disable a display of the first computing device.

15. The first computing device of claim 14, wherein:
the notification redirection module is operable to determine that the first computing device has not moved within the threshold period of time based on the sensor data from the accelerometer and a resistance measurement from a galvanic response sensor of the first computing device, and
the resistance measurement indicates that the first computing device is not being worn if the resistance measurement is outside a range of 10 kiloohms to 10 megaohms, inclusive.

16. The first computing device of claim 14, wherein:
the notification redirection module is operable to determine that the first computing device has not moved within the threshold period of time based on the sensor data from the accelerometer and a temperature measurement from a temperature sensor of the first computing device, and
the temperature measurement indicates that the first computing device is not being worn if the temperature measurement is outside a range of 36 degrees Celsius to 37 degrees Celsius inclusive.

\* \* \* \* \*